United States Patent
Cho et al.

(10) Patent No.: US 8,121,210 B2
(45) Date of Patent: Feb. 21, 2012

(54) APPARATUS AND METHOD FOR SIGNAL DETECTION IN MULTIPLE INPUT MULTIPLE OUTPUT WIRELESS COMMUNICATION SYSTEM

(75) Inventors: Ji-Hoon Cho, Suwon-si (KR); Kyun-Byoung Ko, Hwaseong-si (KR); Sung-Kwon Jo, Seoul (KR); Jae-Hyok Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 984 days.

(21) Appl. No.: 12/021,794

(22) Filed: Jan. 29, 2008

(65) Prior Publication Data

US 2008/0181342 A1    Jul. 31, 2008

(30) Foreign Application Priority Data

Jan. 29, 2007 (KR) .............................. 2007-0009029

(51) Int. Cl.
*H04B 7/02* (2006.01)
*H04L 1/02* (2006.01)

(52) U.S. Cl. ...................................... 375/267

(58) Field of Classification Search .................. 375/130, 375/260, 267, 299, 316, 320, 340, 343, 346, 375/347, 349, 350; 455/63.1, 69, 101, 132, 455/137, 213, 273, 307, 339, 562.1; 370/203, 370/208, 210, 329
See application file for complete search history.

(56) References Cited

U.S. PATENT DOCUMENTS

| | | | | |
|---|---|---|---|---|
| 2004/0114695 A1* | 6/2004 | Astely et al. | ................... | 375/343 |
| 2004/0165675 A1* | 8/2004 | Ito et al. | ........................ | 375/267 |
| 2004/0247061 A1* | 12/2004 | Matsumoto et al. | .......... | 375/346 |
| 2005/0009486 A1* | 1/2005 | Al-Dhahir et al. | ............. | 455/213 |
| 2005/0101253 A1* | 5/2005 | Pajukoski et al. | ............. | 455/63.1 |
| 2005/0101279 A1* | 5/2005 | Lee et al. | ..................... | 455/278.1 |
| 2006/0114815 A1* | 6/2006 | Hasegawa et al. | ............ | 370/208 |
| 2006/0209765 A1* | 9/2006 | Li et al. | ......................... | 370/334 |
| 2006/0215781 A1* | 9/2006 | Lee et al. | ...................... | 375/267 |
| 2006/0291596 A1* | 12/2006 | Piirainen | ....................... | 375/346 |
| 2007/0070945 A1* | 3/2007 | Wang et al. | .................... | 370/329 |
| 2007/0254607 A1* | 11/2007 | Bandemer et al. | ............. | 455/101 |
| 2008/0212666 A1* | 9/2008 | Kuchi et al. | .................... | 375/231 |
| 2009/0154599 A1* | 6/2009 | Siti et al. | ........................ | 375/320 |

OTHER PUBLICATIONS

Jiang Yue et al., "Channel Estimation and Data Detection for MIMO-OFDM Systems", Global Telecommunications Conference, GLOBECOM, vol. 2, pp. 581-585, Dec. 2003.

Jianxuan Du et al., "Parallel Detection of Space-time Codes by Predictive Soft Interference Cancellation", IEEE International Conference on Communications, pp. 2746-2750, vol. 5, Jun. 20-24, 2004.

* cited by examiner

*Primary Examiner* — David C. Payne
*Assistant Examiner* — Syed Haider
(74) *Attorney, Agent, or Firm* — The Farrell Law Firm, P.C.

(57) ABSTRACT

A Multiple Input Multiple Output (MIMO) wireless communication system is provided. A receiving end apparatus includes an estimator for estimating a channel between a plurality of Transmit (Tx) antennas of a transmitting end and a plurality of Receive (Rx) antennas of a receiving end; a filter for extracting a sum between interference and noise included in an Rx signal by using the estimated channel value and for computing a covariance matrix for the sum between the interference and the noise; and a detector for detecting a Tx signal by using a signal processing matrix generated from the covariance matrix.

17 Claims, 6 Drawing Sheets

APPARATUS AND METHOD FOR SIGNAL DETECTION IN MULTIPLE INPUT MULTIPLE OUTPUT WIRELESS COMMUNICATION SYSTEM

PRIORITY

This application claims priority under 35 U.S.C. §119(a) to a Korean patent application filed in the Korean Intellectual Property Office on Jan. 29, 2007 and assigned Serial No. 2007-9029, the entire disclosure of which is hereby incorporated by reference.

BACKGROUND OF THE INVENTION

1. Field of the Invention

The present invention relates to a Multiple Input Multiple Output (MIMO) wireless communication system. More particularly, the present invention relates to an apparatus and method for detecting a signal by considering an interference signal from a neighboring cell in a MIMO wireless communication system.

2. Description of the Related Art

Recently, significant attention is paid to the Multiple Input Multiple Output (MIMO) technique, and active research on the MIMO technique is currently being conducted. The MIMO technique performs communication by using a plurality of streams through a plurality of antennas. Therefore, with this technique, a channel capacity can be remarkably improved in comparison with a case of using a single antenna. For example, if both a transmitting end and a receiving end use M Transmit (Tx)/Receive (Rx) antennas in a case where channels between the antennas are independent, and a bandwidth and an overall transmission power are fixed, then an increase in an average channel capacity is M times higher in comparison with the case of using a single antenna.

Typical examples of a signal receiving method used in a MIMO wireless communication system include a Minimum Mean Square Error (MMSE) method and a Maximum Likelihood (ML) method. When using the MMSE method and the ML method, a Tx signal is determined by considering Additive White Gaussian Noise (AWGN). Specifically, in the MMSE method, the Tx signal is determined by multiplying an Rx signal by a specific nulling matrix. In this case, the nulling matrix is selected so that a Mean Square Error (MSE) value between the detected Tx signal and the Rx signal is minimized. In the ML method, all possible combinations of Tx signals are compared with an Rx signal, so as to select the most similar Tx signal.

In the MMSE method, the nulling matrix is computed by using Equation (1) below.

$$W = (H^H + \sigma^2 I_{n_T})^{-1} H^H \quad (1)$$

In Equation (1), W denotes a nulling matrix, H denotes a channel matrix, σ denotes a standard deviation of noise, $I_{n_T}$ denotes a unit matrix having a size of $n_T$, and $n_T$ denotes the number of Tx antennas.

In the ML method, if k Tx signals are used, an approximate value between possible combinations of Tx signals and the RX signal is computed by squaring distances as expressed by Equation (2) below.

$$\|y - H\hat{x}\| = \|h_0(x_0 - x_0[i]) + \ldots + h_{k-1}(x_{k-1} - x_{k-1}[j]) + n\|^2 \quad (2)$$

In Equation (2), y denotes a received signal vector, H denotes a channel matrix, $\hat{x}$ denotes a Tx signal detected by a receiving end, $h_k$ denotes a channel vector for a $k^{th}$ Tx signal, $x_k$ denotes the $k^{th}$ Tx signal, $x_k[m]$ denotes an $m^{th}$ transmittable signal for the $k^{th}$ Tx signal, that is, the number of constellations, and n denotes a noise vector. That is, the receiving end conforming to the ML method determines a Tx signal among possible combinations of Tx signals when a result of Equation (2) above is minimized.

As described above, a signal transmitted through a plurality of antennas can be detected by using the MMSE or ML method. However, in a conventional cellular system, a neighboring cell causes not only noise but also interference. That is, as shown in Equation (1) and Equation (2) above, when only noise is taken into account in the MMSE and ML methods, there is a high possibility that the interference results in deterioration of system throughput. Therefore, there is a need for a method of detecting a signal by considering not only noise but also interference from a neighboring cell.

SUMMARY OF THE INVENTION

An aspect of the present invention is to address at least the above-mentioned problems and/or disadvantages and to provide at least the advantages described below. Accordingly, an aspect of the present invention is to provide an apparatus and method for improving reception throughput in a Multiple Input Multiple Output (MIMO) wireless communication system.

Another aspect of the present invention is to provide an apparatus and method for detecting a signal by considering an interference signal in a MIMO wireless communication system.

Another aspect of the present invention is to provide an apparatus and method for detecting a signal in consideration of interference by using a pre-whitening matrix in a MIMO wireless communication system.

Another aspect of the present invention is to provide an apparatus and method for detecting a signal in consideration of interference by using an inverse matrix of a covariance matrix which is obtained by summing interference and noise in a MIMO wireless communication system.

According to an aspect of the present invention, a receiving end apparatus in a MIMO wireless communication system is provided. The apparatus includes an estimator for estimating a channel matrix between a plurality of Transmit (Tx) antennas of a transmitting end and a plurality of Receive (Rx) antennas of a receiving end; a filter for extracting a sum between interference and noise included in an Rx signal vector by using the estimated channel matrix and for computing a covariance matrix for the sum between the interference and the noise; and a detector for detecting a Tx signal vector by using a signal processing matrix generated from the covariance matrix.

According to another aspect of the present invention, a signal detection method in a MIMO wireless communication system is provided. The method includes estimating a channel matrix between a plurality of Tx antennas of a transmitting end and a plurality of Rx antennas of a receiving end; extracting a sum between interference and noise included in an Rx signal vector by using the estimated channel matrix; computing a covariance matrix for the sum between the interference and the noise; and detecting a Tx signal vector by using a signal processing matrix generated from the covariance matrix.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

DETAILED DESCRIPTION OF THE PREFERRED EMBODIMENTS

Figure 1:
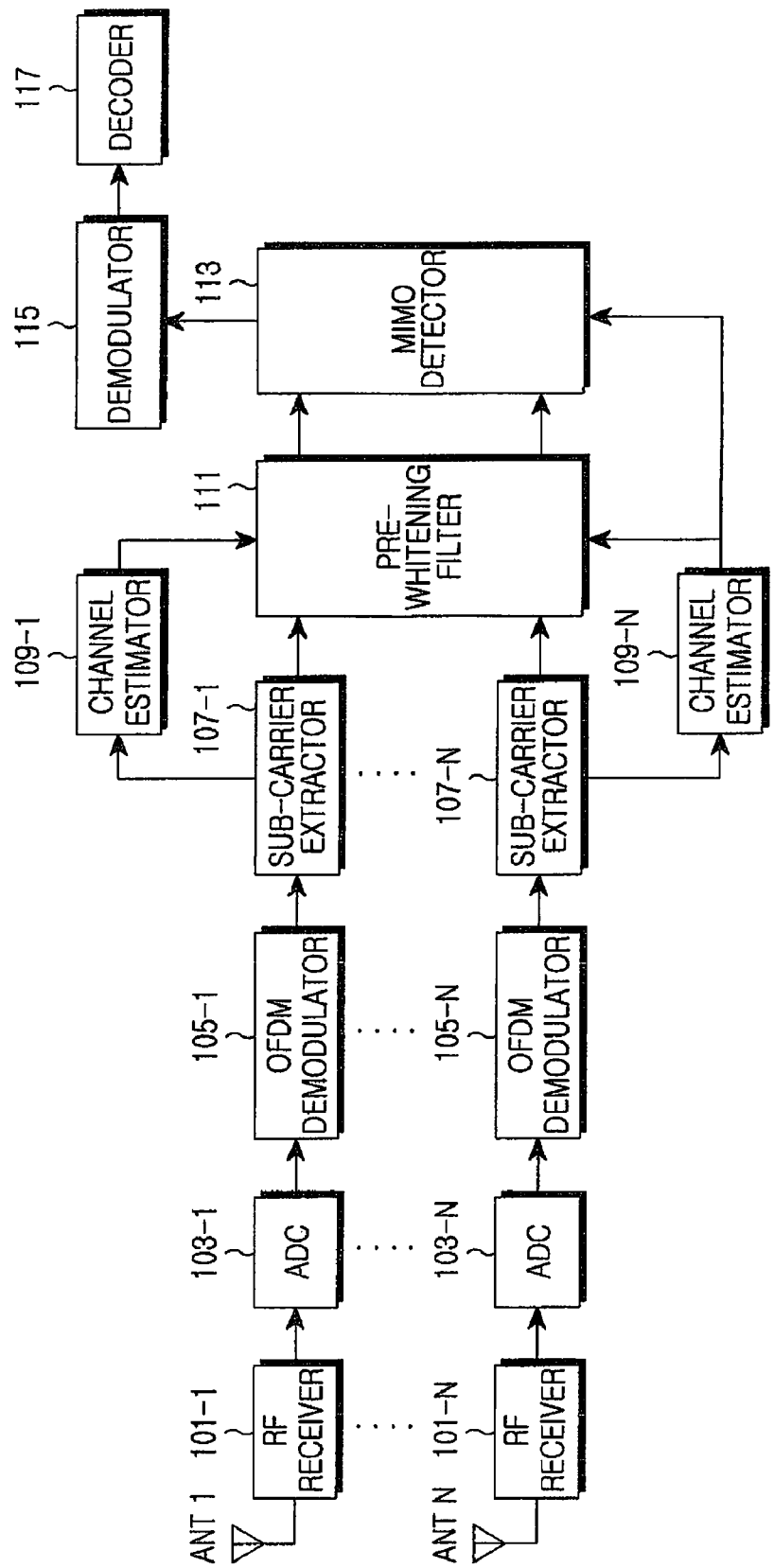
FIG. 1 is a block diagram of a receiving end in a Multiple Input Multiple Output (MIMO) wireless communication system according to the present invention.

Preferred embodiments of the present invention will be described below with reference to the accompanying drawings. In the following description, well-known functions or constructions are not described in detail since they would obscure the invention in unnecessary detail.

Hereinafter, the preferred embodiments of the present invention will be described in which a signal is detected by canceling an interference signal from a neighboring cell in a Multiple Input Multiple Output (MIMO) wireless communication system. Although an Orthogonal Frequency Division Multiplexing (OFDM)-based wireless communication system is described in the present invention for example, the present invention may also apply to other types of wireless communication systems.

In an ideal case, when DownLink (DL) communication is made in a wireless communication system, a Mobile Station (MS) receives a signal only from a serving Base Station (BS). However, if a frequency reuse factor is 1, the MS also receives a signal from a neighboring BS since the neighboring BS also performs communication by using the same resource. This acts as interference to the MS.

Likewise, in an ideal case, when UpLink (UL) communication is made, a BS receives a signal only from MSs located in a cell. However, since a neighboring BS and neighboring MSs, which are located in a neighboring cell, also perform communication by using the same resource, the BS also receives a signal from the neighboring MSs. This acts as interference to the BS.

An interference signal can be canceled by multiplying a received signal by a specific preprocessing matrix. Therefore, the present invention provides a method of generating the preprocessing matrix capable of canceling the interference signal. Herein, the preprocessing matrix is computed by using a predetermined signal (e.g., a pilot signal), and is defined as a pre-whitening matrix in the present invention. That is, a receiving end of the present invention multiplies a Receive (Rx) signal by the pre-whitening matrix, and thus can obtain an interference-canceled Rx signal. The receiving end may be either a BS (in case of UL transmission) or an MS (in case of DL transmission).

In a situation where an interference signal is present, the Rx signal vector may be expressed by Equation (3) below.

$$y = Hx + H_I x_I + n \quad (3)$$

In Equation (3), y denotes an Rx signal vector, H denotes a channel matrix between a transmitting end and a receiving end, x denotes a Transmit (Tx) signal vector, n denotes noise, $H_I$ denotes an interference channel matrix, and $x_I$ denotes an interference Tx$_I$ signal vector.

The receiving end can obtain knowledge of the channel matrix H between the transmitting end and the receiving end by performing channel estimation, and also can obtain knowledge of the Tx signal vector x of the transmitting end in case of the predetermined pilot signal. The receiving end averages consecutive estimated values in a frequency axis or a time axis, and thus estimates channel matrix by canceling an influence of an interference signal. A product between the estimated channel matrix H and the Tx signal vector x is subtracted from the Rx signal vector y. Then, the receiving end extracts a sum between an interference component $H_I x_I$ and a noise component n. Herein, the sum between the interference component $H_I x_I$ and the noise component n is related to the pre-whitening matrix, as expressed by Equation (4) below.

$$\begin{aligned} R_{n'n'} &= E[n'n'^H] = E[(H_I S + n)(H_I S + n)^H] \\ &= E[H_I SS^H H_I^H + nS^H H_I^H + H_I Sn^H + nn^H] \\ &= H_I E[SS^H] H_I^H + E[nS^H] H_I^H + H_I E[Sn^H] + E[nn^H] \\ &= H_I I_M H_I^H + C_{n_R \times n_R} = LL^H \end{aligned} \quad (4)$$

In Equation (4), n' denotes a sum between an interference and noise, $R_{n'n'}$ denotes a covariance matrix of n', $H_I$ denotes an interference channel matrix, S denotes the interference signal vector, n denotes the noise, $I_M$ denotes a unit matrix having a size of M, $C_{n_R \times n_R}$ denotes a covariance matrix of the noise, and L denotes an inverse matrix of a pre-whitening matrix.

As shown in Equation (4) above, the receiving end computes the pre-whitening matrix for canceling interference by using the sum n' between the interference signal and the noise. In other words, the receiving end performs a Cholesky operation on the covariance matrix of the sum n' between the interference signal and the noise, and thus obtains the pre-whitening matrix $L^{-1}$.

As described above, prior to performing signal detection using the MMSE method or the ML method, the receiving end cancels interference by multiplying the Rx signal by the pre-whitening matrix, thereby improving reliability in the detection of a Tx signals.

Hereinafter, a structure and operation of a receiving end for canceling interference by using the aforementioned method will be described in detail with reference to the accompanying drawings.

FIG. 1 is a block diagram of a receiving end in a MIMO wireless communication system according to the present invention.

Referring to FIG. 1, the receiving end includes a plurality of Radio Frequency (RF) receivers 101-1 to 101-N, a plurality of Analog to Digital Converters (ADCs) 103-1 to 103-N, a plurality of OFDM demodulators 105-1 to 105-N, a plurality of sub-carrier extractors 107-1 to 107-N, a plurality of channel estimators 109-1 to 109-N, a pre-whitening filter 111, a MIMO detector 113, a demodulator 115, and a decoder 117.

The RF receivers 101-1 to 101-N convert signals received through respective antennas into baseband signals. The ADCs 103-1 to 103-N convert analog signals into digital signals. The OFDM demodulators 105-1 to 105-N convert OFDM symbols provided by performing a Fast Fourier Transform (FFT) operation into sub-carrier signals.

The sub-carrier extractors 107-1 to 107-N convert the sub-carrier signals received in parallel into signals so that a format of each signal is restored to a previous format before mapping. Further, the sub-carrier extractors 107-1 to 107-N extract pilot signals and output the extracted pilot signals to the channel estimators 109-1 to 109-N, and also extract data signals and output the extracted data signal to the pre-whitening filter 111. The channel estimators 109-1 to 109-N receive signals and thus estimate a channel between a specific antenna and the transmitting end. The predetermined signal (e.g., the pilot signal) is used in the channel estimation. During the channel estimation, an influence of an interference signal is canceled by averaging the consecutive values in the frequency axis or the time axis.

The whitening filter 111 cancels interference from an Rx signal provided from the sub-carrier extractors 107-1 to 107-N. In other words, the whitening filter 111 computes a sum between the interference signal from the receiving end and noise by using channel information provided from the channel estimators 109-1 to 109-N and an original pilot signal value, and also computes a covariance matrix for the sum between the interference signal and the noise. In addition, the whitening filter 111 obtains a pre-whitening matrix from the covariance matrix. For example, the whitening filter 111 obtains the pre-whitening matrix from the covariance matrix by performing the Cholesky operation. In this case, the whitening filter 111 updates the pre-whitening matrix for every predetermined time period. For example, update may be performed for every frame, and this may differ depending on system operation policy.

The MIMO detector 113 detects a Tx signal by using the pre-whitening filter provided from the whitening filter 111. In other words, the MIMO detector 113 multiples the Rx signal and the channel value by the pre-whitening filter, and thus detects the Tx signal by using the resultant Rx signal and the resultant channel value, which are obtained by performing the multiplication. For example, the MIMO detector 113 detects the Tx signal according to the MMSE method or the ML method. In the case of using the MMSE method, the MIMO detector 113 detects the Tx signal by computing the nulling matrix as expressed by Equation (5) below.

$$W = L^{-1}(H'^H H' + I_{n_T})^{-1} H'^H \quad (5)$$

In Equation (5), W denotes a nulling matrix, $L^{-1}$ denotes a pre-whitening matrix, H' denotes a channel matrix multiplied by the pre-whitening matrix, and $I_{n_T}$ denotes a unit matrix having a size of $n_T$.

When using the ML method, the MIMO detector 113 compares possible combinations of Tx signals with the Rx signal vector in terms of similarity, and then determines the Tx signal vector. For example, as expressed by Equation (6) below, the MIMO detector 113 compares square values of distances between the possible combinations of Tx signals and the Rx signal, and then determines the Tx signal.

$$\|y' - H'x\|^2 = (y - Hx) R_{n'n'}^{-1} (y - Hx)^H \quad (6)$$

In Equation (6), y' denotes an Rx signal vector multiplied by a pre-whitening matrix, H' is a channel matrix multiplied by the pre-whitening matrix, x denotes a Tx signal, and $R_{n'n'}$ denotes a covariance matrix for a sum between an interference signal and noise.

As shown in Equation (6) above, if a first value is computed by using an Rx signal vector, which has passed through the whitening filter 111, and a channel matrix, and a second value is computed by using an RX signal vector, which has not passed through the whitening filter 111, and the channel matrix, then the first value is obtained by multiplying the second value by $R_{n'n'}^{-1}$. Thus, Equation (6) above can be expressed by Equation (7) below.

$$(y - Hx) R_{n'n'}^{-1} (y - Hx)^H = R_{n'n'}^{-1} \|y - Hx\|^2 \quad (7)$$

In Equation (7), y denotes an Rx signal vector, H denotes a channel matrix, x denotes a Tx signal vector, and $R_{n'n'}$ denotes a covariance matrix for a sum between an interference and noise.

Therefore, when the receiving end performs signal detection using the ML method, the same result as the case of using the whitening filter 111 can be obtained by multiplying an inverse matrix $R_{n'n'}^{-1}$ of the covariance matrix for the sum between an interference and noise without having to provide the whitening filter 111. Herein, the inverse matrix $R_{n'n'}^{-1}$ may be computed by the MIMO detector 113 or may be computed by using an additional element.

The demodulator 115 converts complex symbols into a bit-stream according to a suitable constellation. The decoder 117 decodes the bit-stream according to a suitable decoding method, and thus converts the bit-stream into an information bit-stream. Optionally, the demodulator 115 and the decoder 117 may be provided in a plural number.

According to the present invention, the receiving end computes a covariance matrix for a sum between interference and noise, and then performs signal detection in consideration of interference by using a signal processing matrix generated from the covariance matrix. The signal processing matrix is either a pre-whitening matrix or an inverse matrix of the covariance matrix. In either case, two embodiments are provided in the present invention. Hereinafter, a case of using the pre-whitening matrix will be described with reference to FIG. 2, and a case of using the inverse matrix of the covariance matrix will be described with reference to FIG. 3.

Figure 2:
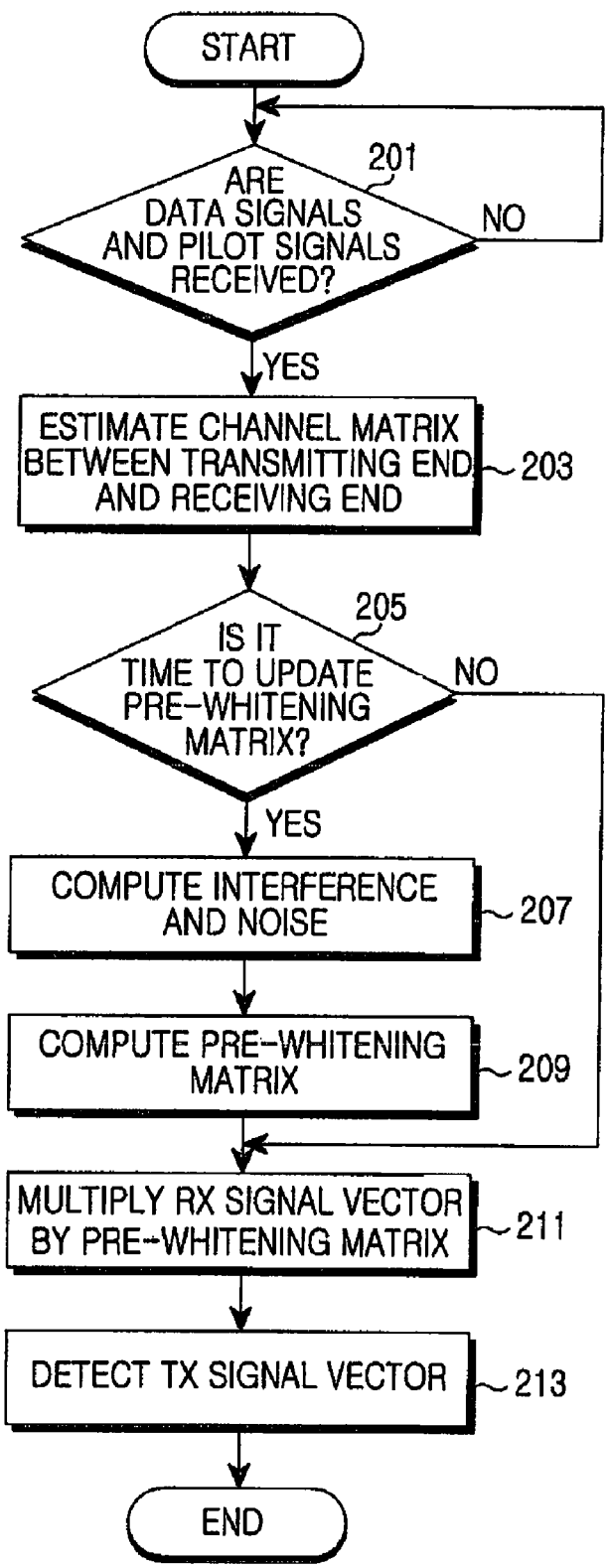
FIG. 2 is a flowchart illustrating a signal detection process performed by a receiving end in a MIMO wireless communication system according to an embodiment of the present invention.

FIG. 2 is a flowchart illustrating a signal detection process performed by a receiving end in a MIMO wireless communication system according to an embodiment of the present invention.

Referring to FIG. 2, the receiving end determines if a data signals and a pilot signals are received at each Rx antenna in step 201. The pilot signal is a predetermined signal that is used in channel estimation.

Upon receiving the data signals and the pilot signals, the receiving end estimates a channel matrix between the receiving end and a transmitting end in step 203. That is, the receiving end estimates the channel matrix by using the pilot signals received at each antenna. In this case, the receiving end averages consecutive values in a frequency axis or a time axis, and thus estimates the channel while canceling an influence of an interference signal.

In step 205, the receiving end determines if it is time to update a pre-whitening matrix. For example, the pre-whitening matrix may be updated for every tile (i.e., a unit of channel estimation) or for every frame. A period of time for the pre-whitening matrix may differ depending on system operation policy.

If it is not the time to update the pre-whitening matrix, proceeding to step 211, the receiving end multiplies the data signals by the pre-whitening matrix, and then performs the subsequent steps.

If it is the time to update the pre-whitening matrix, in step 207, the receiving end computes a sum between the interference and noise. That is, the receiving end computes the sum between the interference and the noise by canceling the channel matrix between the receiving end and the transmitting end along with a Tx pilot signal component from the received pilot signals.

In step 209, the receiving end computes the pre-whitening matrix by using the sum between the interference and the noise. In other words, the receiving end computes a covariance matrix for the sum between the interference and the noise, and computes the pre-whitening matrix by performing the Cholesky operation on the covariance matrix.

In step 211, the receiving end multiplies the Rx signal by the pre-whitening matrix.

In step 213, the receiving end detects a Tx signal vector for the data signals by using the Rx signal vector, which is multiplied by the pre-whitening matrix, and the channel matrix. For example, the receiving end detects the Tx signal vector according to the MMSE method or the ML method.

Figure 3:
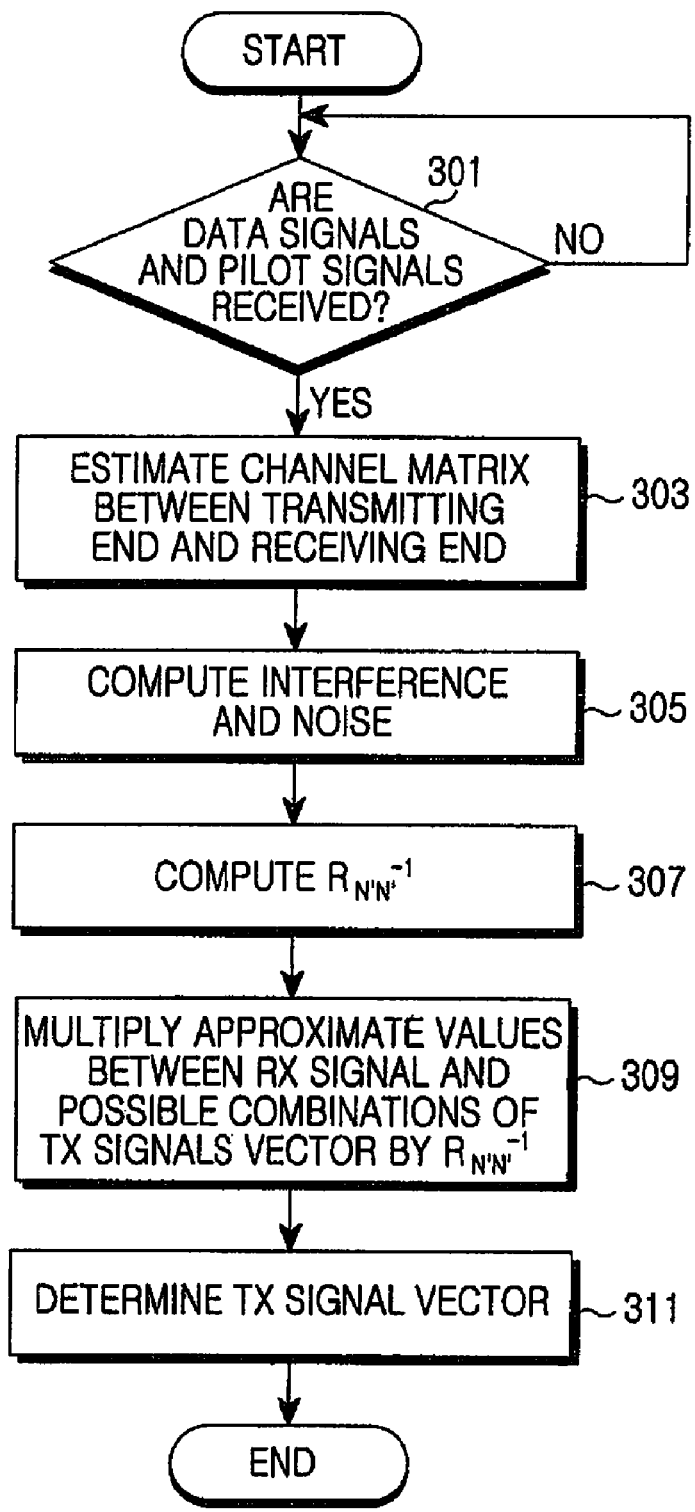
FIG. 3 is a flowchart illustrating a signal detection process performed by a receiving end in a MIMO wireless communication system according to another embodiment of the present invention.

FIG. 3 is a flowchart illustrating a signal detection process performed by a receiving end in a MIMO wireless communication system according to another embodiment of the present invention. In the process of FIG. 3, the receiving end uses the ML method, and does not directly multiply an RX signal by a pre-whitening matrix.

Referring to FIG. 3, the receiving end determines if a data signals and a pilot signals are received at each Rx antenna in step 301. The pilot signal is a pre-determined signal that is used in channel estimation.

Upon receiving the data signals and the pilot signals, the receiving end estimates a channel matrix between the receiving end and a transmitting end in step 303. That is, the receiving end estimates the channel matrix by using the pilot signals received at each Rx antenna. In this case, the receiving end averages consecutive values in a frequency axis or a time axis, and then estimates the channel matrix by canceling an influence of an interference signal.

In step 305, the receiving end computes a sum between the interference and noise. That is, the receiving end computes the sum between the interference and the noise by canceling the channel matrix between the receiving and the transmitting end along with a Tx pilot signal component from the received pilot signals.

In step 307, the receiving end computes an inverse matrix $R_{n'n'}^{-1}$ of the covariance matrix for the sum between the interference and the noise.

In step 309, the receiving end multiples an ML metric by the value $R_{n'n'}^{-1}$, wherein the ML metric indicates approximate values between the Rx signal vector and the possible combinations of Tx signals. The approximate values are square values of distance between the Rx signal vector and the possible combinations of Tx signals. That is, the receiving end obtains a result as expressed by Equation (7) above.

In step 311, the receiving end determines a Tx signal vector using a result value obtained in step 309. In other words, the receiving end determines the Tx signal vector among the possible combinations of Tx signals when the result values of the multiplication operation between the approximate values and the value $R_{n'n'}^{-1}$ is minimized.

Figure 4A:
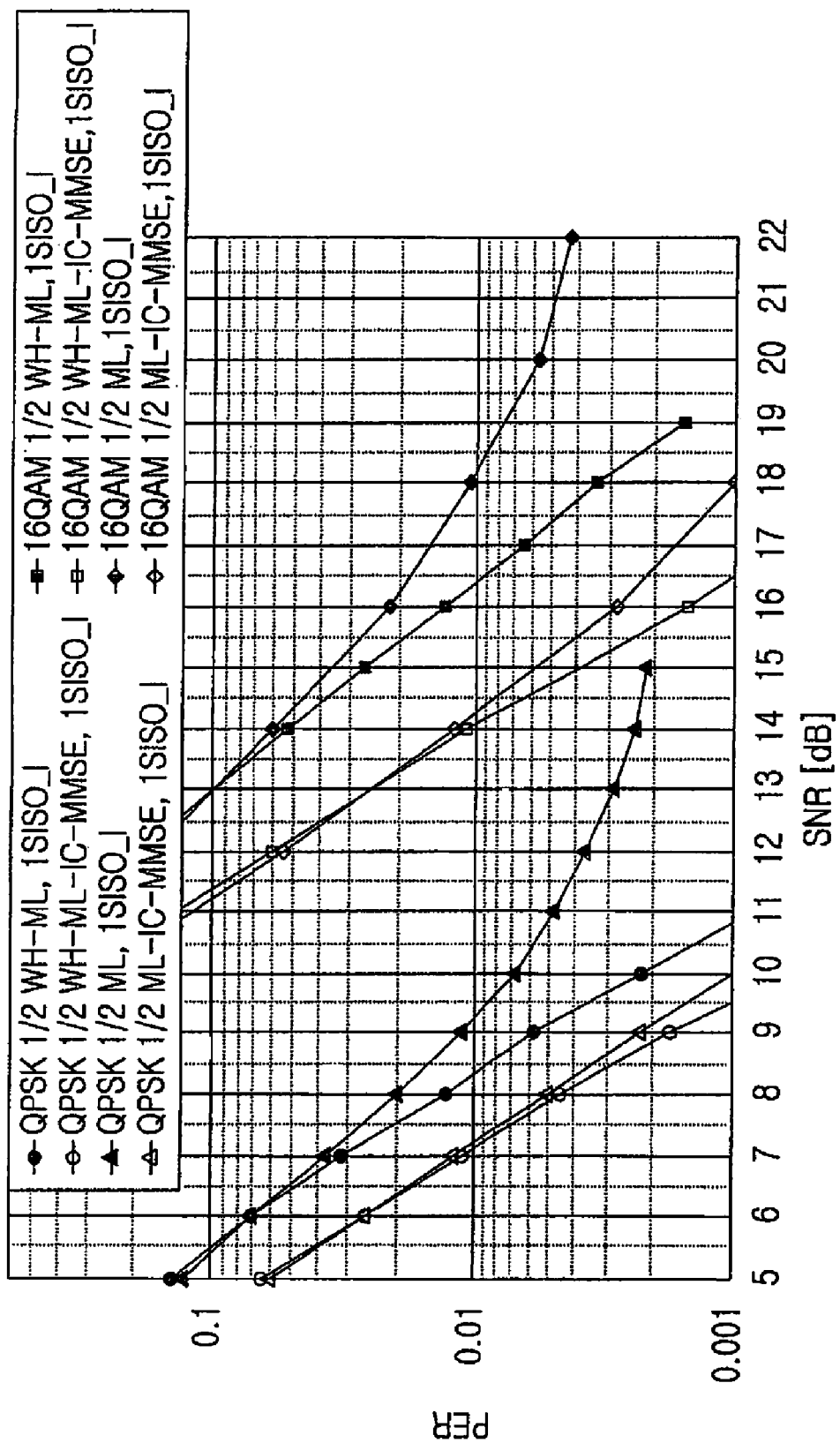
FIGS. 4A to 4C are graphs illustrating throughput of an interference cancellation method according to the present invention.
Figure 4B:
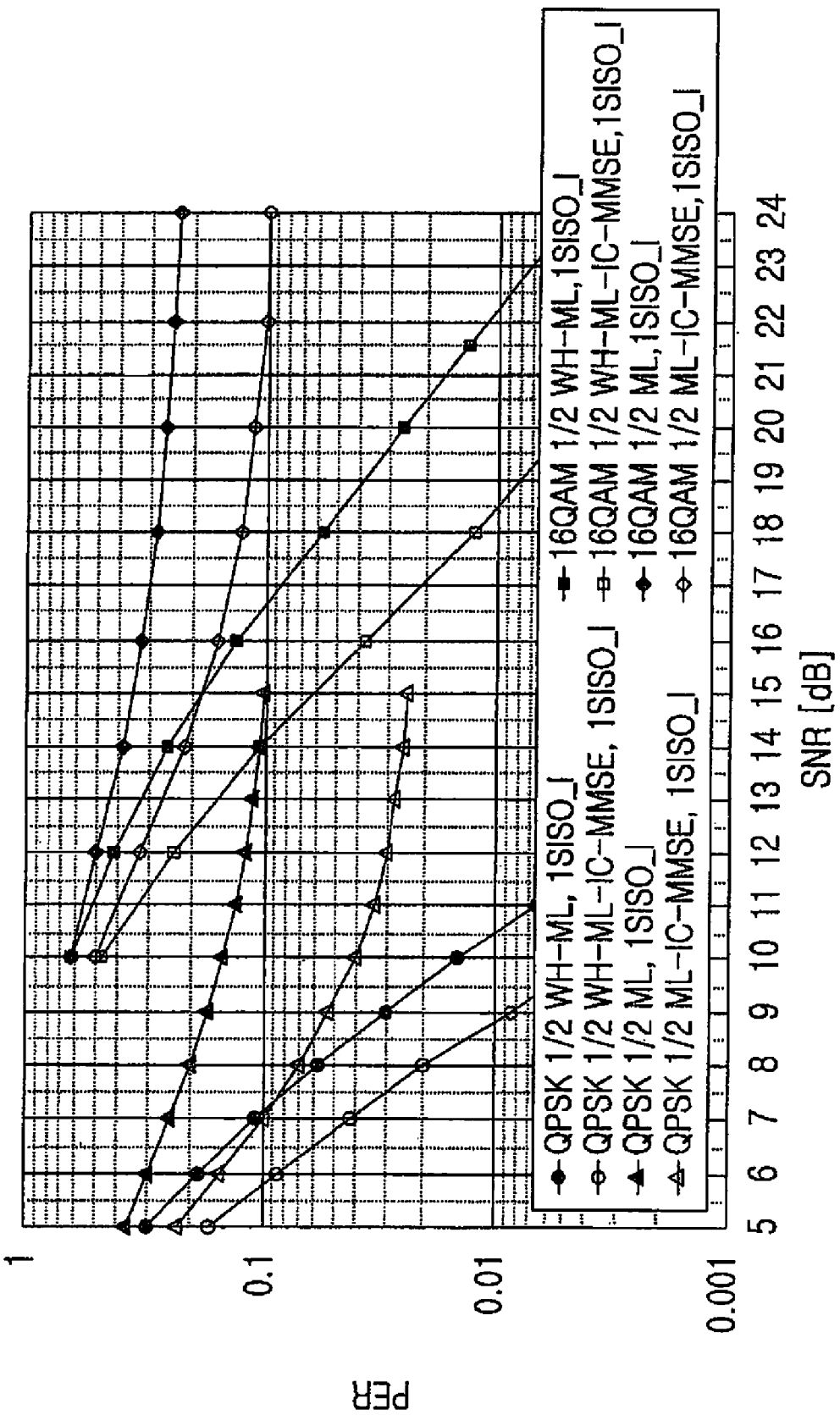
Figure 4C:
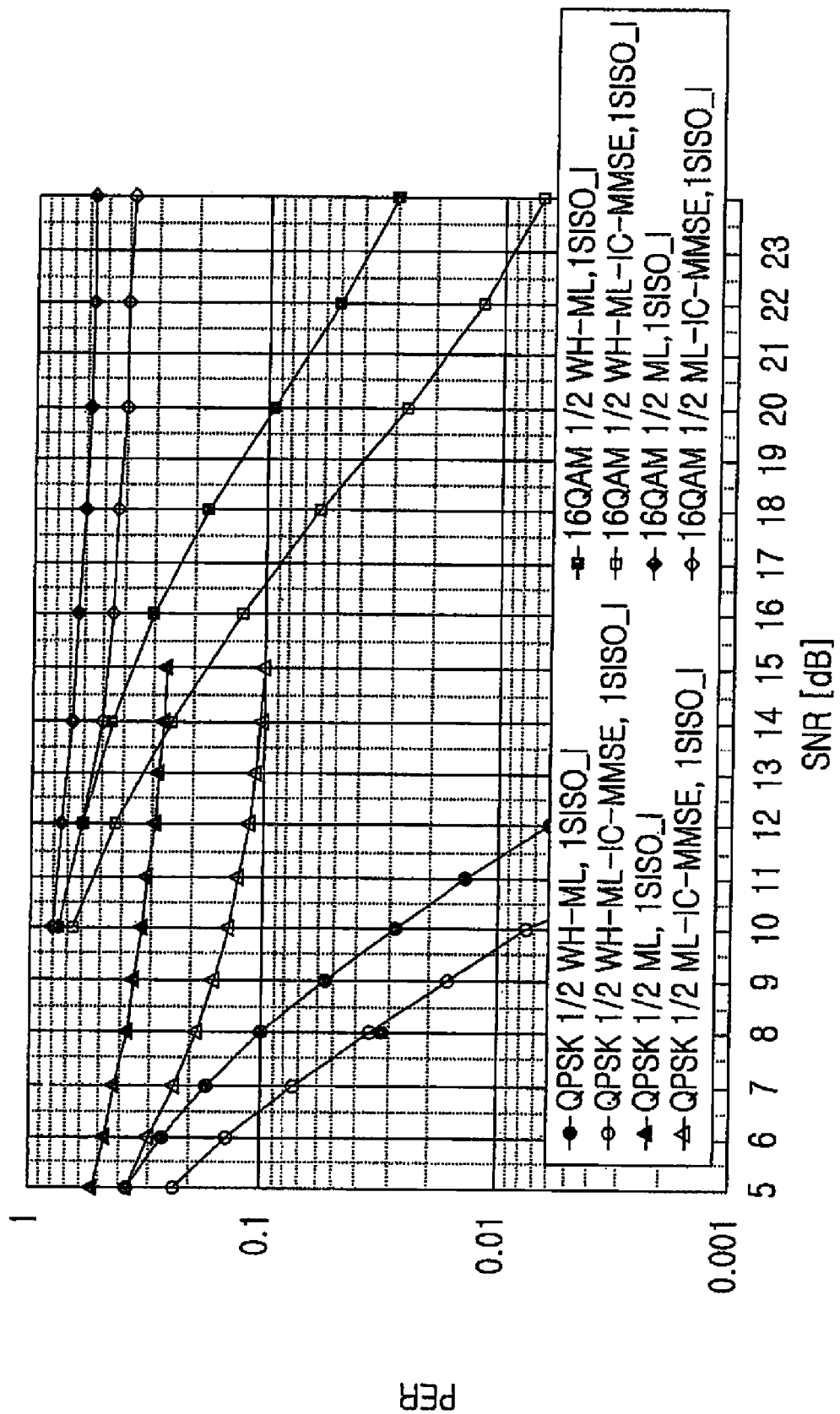

FIGS. 4A to 4C are graphs illustrating throughput of an interference cancellation method according to the present invention.

Referring to FIGS. 4A to 4C, a simulation result is illustrated under the assumption that a wireless communication system in use conforms to an Institute of Electrical and Electronics Engineers (IEEE) 802.16e standard. In FIGS. 4A to 4C, a horizontal axis represents a Signal to Noise Ratio (SNR), and a vertical axis represents a Packet Error Rate (PER). Two signal receiving methods are taken into account in the simulation result. In a first method, a signal is initially received by using the ML method, a result thereof is subject to Interference Cancellation (IC), and is then subject to Maximum Ratio Combining (MRC), and this method is referred to as an ML-IC-MRC method. In a second method, a signal is initially received by using the ML method, a result thereof is subject to IC, and is then subject to MMSE, and this method is referred to as an ML-IC-MMSE method.

FIG. 4A shows a simulation result obtained when modulation and coding are performed by using Quadrature Phase Shift Keying (QPSK) 1/2 and 16-Quadrature Amplitude modulation (QAM) 1/2. Herein, an 8-slot burst is allocated. It is also assumed that one Single Input Single Output (SISO) MS acts as interference from an external cell, and the magnitude of the interference is 10 dB or 16 dB with respect to a currently transmitted/received signal. Referring to FIG. 4A, throughput is not much improved because the interference from the external cell is relatively small. However, the graph shows that the throughput is improved by using the pre-whitening filter of the present invention.

FIG. 4B shows a simulation result obtained for a first case where QPSK 1/2 is used, an 8-slot burst is allocated, and the Signal to Interference Ratio (SIR) is 5 dB and for a second case where 16-QAM 1/2 is used, an 8-slot burst is allocated, and an SIR is 10 dB. That is, it is assumed in the simulation result of FIG. 4B that an external interference is greater than the case of FIG. 4A. In this case, throughput is further improved than in the case of FIG. 4A.

FIG. 4C shows a simulation result obtained for a first case where QPSK 1/2 is used, an 8-slot burst is allocated, and the SIR is 3 dB and for a second case where 16-QAM 1/2 is used, an 8-slot burst is allocated, and the SIR is 7 dB. That is, it is assumed in the simulation result of FIG. 4C that an external interference is the greatest. In FIG. 4C, since the external interference is significant, a PER is not improved regardless of a high SNR unless the pre-whitening filter of the present invention is used. However, the graph of FIG. 4C shows that throughput is significantly improved by using the pre-whitening filter.

According to the present invention, in a MIMO wireless communication system, a pre-whitening matrix is computed to cancel an interference signal, thereby improving signal reception throughput at a receiving end.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A receiving end apparatus in a Multiple Input Multiple Output (MIMO) wireless communication system, the apparatus comprising:

an estimator for estimating a channel matrix between a plurality of Transmit (Tx) antennas of a transmitting end and a plurality of Receive (Rx) antennas of a receiving end;

a filter for extracting a sum between interference and noise included in an Rx signal vector by using the estimated channel matrix and for computing a covariance matrix for the sum between the interference and the noise, and for computing a pre-whitening matrix by using the covariance matrix and; and a detector for detecting a Tx signal vector by using the pre-whitening matrix, wherein the estimator cancels an influence of an interference signal in the channel matrix by averaging consecutive channel values in one of a frequency axis and a time axis, and wherein the detector multiplies the pre-whitening matrix by the Rx signal vector and the channel matrix, and detects the Tx signal vector by using the Rx signal vector and the channel matrix to each of which the pre-whitening matrix is multiplied.

2. The apparatus of claim 1, wherein the filter extracts the sum between the interference and the noise by subtracting a product between a predetermined signals and the estimated channel matrix from the Rx signal vector, and computes the covariance matrix as expressed by: $R_{n'n'}=E[n'n'^H]$, where $R_{n'n'}$ denotes a covariance matrix, E[ ] denotes an expectation value operator, n' denotes a sum between interference and noise, and $n'^H$ denotes a transpose conjugate matrix of n'.

3. The apparatus of claim 1,
wherein the filter provides the pre-whitening matrix to the detector.

4. The apparatus of claim 1, wherein the filter computes the pre-whitening matrix by using a relationship as expressed by: $R_{n'n'}=LL^H$, where $R_{n'n'}$ denotes a covariance matrix, L denotes an inverse matrix of the pre-whitening matrix, and $L^H$ denotes a transpose conjugate matrix of L.

5. The apparatus of claim 4, wherein the filter computes the pre-whitening matrix by performing a Cholesky operation.

6. The apparatus of claim 1, wherein the detector detects the Tx signal according to one of a Minimum Mean Square Error (MMSE) method and a Maximum Likelihood (ML) method.

7. The apparatus of claim 1, wherein the filter updates the pre-whitening matrix for every predetermined time period.

8. A receiving end apparatus in a Multiple Input Multiple Output (MIMO) wireless communication system, the apparatus comprising:
an estimator for estimating a channel matrix between a plurality of Transmit (Tx) antennas of a transmitting end and a plurality of Receive (Rx) antennas of a receiving end;
a signal processor for extracting a sum between interference and noise included in an Rx signal vector by using the estimated channel matrix, for computing a covariance matrix for the sum between the interference and the noise, and for computing an inverse matrix of the covariance matrix; and
a detector for detecting a Tx signal vector by using the inverse matrix of the covariance matrix,
wherein the estimator cancels an influence of an interference signal in the channel matrix by averaging consecutive channel values in one of a frequency axis and a time axis,
wherein the detector multiplies approximate values between an RX signal vector and possible combinations of Tx signals by the inverse matrix of the covariance matrix, and determines a Tx signal vector among the possible combinations of Tx signals when a value obtained from the multiplication operation is minimized.

9. The apparatus of claim 8, wherein the approximate values are square values of distance between the Rx signal vector and the possible combinations of Tx signals.

10. A signal detection method in a Multiple Input Multiple Output (MIMO) wireless communication system, the method comprising:
estimating a channel matrix between a plurality of Transmit (Tx) antennas of a transmitting end and a plurality of Receive (Rx) antennas of a receiving end;
extracting a sum between interference and noise included in an Rx signal vector by using the estimated channel value;
computing a covariance matrix for the sum between the interference and the noise;
computing a pre-whitening matrix by using the covariance matrix; and
detecting a Tx signal vector by using the pre-whitening matrix,
wherein the estimating of a channel matrix comprises canceling an influence of an interference signal in the channel matrix by averaging consecutive channel values in one of a frequency axis and a time axis, and
wherein the detecting of the Tx signal vector by using the pre-whitening matrix comprises:
multiplying the pre-whitening matrix by the Rx signal vector and the channel matrix; and
detecting the Tx signal vector by using the Rx signal vector and the channel matrix to each of which the pre-whitening matrix is multiplied.

11. The method of claim 10, wherein the sum between the interference and the noise is obtained by subtracting a product of a predetermined signal and the estimated channel matrix from the Rx signal vector, and the covariance matrix is computed by: $R_{n'n'}=E[n'n'^H]$, where $R_{n'n'}$ denotes a covariance matrix, E[ ] denotes an expectation value operator, n' denotes a sum between interference and noise, and $n'^H$ denotes a transpose conjugate matrix of n'.

12. The method of claim 10, wherein the pre-whitening matrix is computed by: $R_{n'n'}=LL^H$, where $R_{n'n'}$ denotes a covariance matrix, L denotes an inverse matrix of a pre-whitening matrix, and $L^H$ denotes a transpose conjugate matrix of L.

13. The method of claim 12, wherein the pre-whitening matrix is computed by performing a Cholesky operation.

14. The method of claim 10, wherein the Tx signal is detected according to a Minimum Mean Square Error (MMSE) method or a Maximum Likelihood (ML) method.

15. The method of claim 10, wherein the pre-whitening filter is updated for every predetermined time period.

16. A signal detection method in a Multiple Input Multiple Output (MIMO) wireless communication system, the method comprising:
estimating a channel matrix between a plurality of Transmit (Tx) antennas of a transmitting end and a plurality of Receive (Rx) antennas of a receiving end;
extracting a sum between interference and noise included in an Rx signal vector by using the estimated channel value;
computing a covariance matrix for the sum between the interference and the noise;
computing a inverse matrix of the covariance matrix; and
detecting a Tx signal vector by using the inverse matrix of the covariance matrix,
wherein the estimating of a channel matrix comprises canceling an influence of an interference signal in the channel matrix by averaging consecutive channel values in one of a frequency axis and a time axis,
wherein the detecting of the Tx signal vector by using the inverse matrix of the covariance matrix comprises:
multiplying approximate values between an RX signal vector and possible combinations of Tx signals by the inverse matrix of the covariance matrix; and
determining a Tx signal vector among the possible combinations of Tx signals when a value obtained from the multiplication operation is minimized.

17. The method of claim 16, wherein the approximate values are square values of distance between the Rx signal vector and the possible combinations of Tx signals.

* * * * *